United States Patent [19]
Webb et al.

[11] Patent Number: 5,611,062
[45] Date of Patent: Mar. 11, 1997

[54] SPECIALIZED MILLICODE INSTRUCTION FOR STRING OPERATIONS

[75] Inventors: Charles F. Webb, Poughkeepsie; Mark S. Farrell, Pleasant Valley; Christopher R. Conklin, Kingston; Wen H. Li, Poughkeepsie, all of N.Y.

[73] Assignee: International Business Machines Corporation, Armonk, N.Y.

[21] Appl. No.: 414,961

[22] Filed: Mar. 31, 1995

[51] Int. Cl.⁶ .................................................. G06F 7/04
[52] U.S. Cl. ............................................ 395/376; 395/381
[58] Field of Search .................................. 395/375, 250, 395/800, 650

[56] References Cited

U.S. PATENT DOCUMENTS

| | | | |
|---|---|---|---|
| 3,990,054 | 11/1976 | Perlowski | 395/375 |
| 4,366,537 | 12/1982 | Heller et al. | 395/491 |
| 4,556,951 | 12/1985 | Dickman et al. | 395/375 |
| 4,589,065 | 5/1986 | Auslander | 395/183.11 |
| 4,809,157 | 2/1989 | Eilert et al. | 395/650 |
| 4,896,133 | 1/1990 | Methvin et al. | 340/146.2 |
| 4,901,233 | 2/1990 | Liptay | 395/375 |
| 5,003,468 | 3/1991 | Watanabe et al. | 395/800 |
| 5,136,696 | 8/1992 | Beckwith et al. | 395/375 |
| 5,226,164 | 7/1993 | Nadas et al. | 395/800 |
| 5,261,084 | 11/1993 | Hashiguchi et al. | 395/185.02 |
| 5,280,593 | 1/1994 | Bullion et al. | 395/375 |
| 5,307,504 | 4/1994 | Robinson et al. | 395/800 |
| 5,333,287 | 7/1994 | Buerkle et al. | 395/375 |
| 5,335,334 | 8/1994 | Takahashi et al. | 395/491 |
| 5,341,482 | 8/1994 | Cutler et al. | 395/375 |
| 5,345,567 | 9/1994 | Hayden et al. | 395/375 |
| 5,410,661 | 4/1995 | Tamura | 395/375 |
| 5,465,374 | 11/1995 | Dinkjian et al. | 395/800 |

OTHER PUBLICATIONS

IBM/TDB vol. 35 #4A pp. 451–454 (Milli–Code) 9/2 (Bullion, Chang, Meltzer, Nadas, Pedersen).

*Primary Examiner*—Parshotam S. Lall
*Assistant Examiner*—Patrice L. Winder
*Attorney, Agent, or Firm*—Lynn L. Augspurger; Laurence J. Marhoefer

[57] ABSTRACT

Special millicode instructions accelerate the "inner loop" portion of a millicode routine to execute ESA/390 string instructions. Specifically, these millicode instructions are: Replicate Byte, Find Byte Equal, Find Byte Not Equal, Compare String Bytes instructions.

12 Claims, 4 Drawing Sheets

RBD R₁, R₂ [RRE]

| 'B2C9' | ////////// | R₁ | R₂ |
|---|---|---|---|
| 0 | 16 | 24 | 28  31 |

FIG. 2A

FBE R₁, R₂ [RRE]

| 'B2CC' | ////////// | R₁ | R₂ |
|---|---|---|---|
| 0 | 16 | 24 | 28  31 |

FIG. 2B

FBED R₁, R₂ [RRE]

| 'B2CE' | ////////// | R₁ | R₂ |
|---|---|---|---|
| 0 | 16 | 24 | 28  31 |

FIG. 2C

FBN R₁, R₂ [RRE]

| 'B2CD' | ////////// | R₁ | R₂ |
|---|---|---|---|
| 0 | 16 | 24 | 28  31 |

FIG. 2D

FBND R₁, R₂ [RRE]

| 'B2CF' | ////////// | R₁ | R₂ |
|---|---|---|---|
| 0 | 16 | 24 | 28  31 |

FIG. 2E

CCSB R₁, R₂ [RRF]

| 'B2CA' | R3 | //// | R₁ | R₂ |
|---|---|---|---|---|
| 0 | 16 | 20 | 24 | 28  31 |

FIG. 2F

SPECIALIZED MILLICODE INSTRUCTION FOR STRING OPERATIONS

CROSS REFERENCE TO RELATED APPLICATIONS

The present United States patent application is related to the following co-pending United States patent applications which are assigned to the assignee of the present application.

Application Ser. No. 08/414,154, filed Mar. 31, 1995, entitled "Specialized Millicode Instruction."

Application Ser. No. 08/414,821, filed Mar. 31, 1995, entitled "Millicode Read-Only Storage With Entry Point Patch Control."

Application Ser. No. 08/414,977, filed Mar. 31, 1995, entitled "Hardware Retry Trap for Millicoded Processor"

Application Ser. No. 08/414,158, filed Mar. 31, 1995, entitled "Addressing Extended Memory Using Millicode."

Application Ser. No 08/414,812, filed Mar. 31, 1995, entitled "Mapping Processor State Into A Millicode Addressable Processor State Register Array."

Application Ser. No. 08/414,164, filed Mar. 31, 1995, entitled "Linking Program Access Register Number With Millicode Operand Access."

Application Ser. No. 08/414,975, filed Mar. 31, 1995, entitled "Priority and Recovery Method For System Serialization (Quiesce)."

BACKGROUND OF THE INVENTION

1. Field of the Invention

This invention relates to improvements in pipelined computer processors that execute relatively simple instructions in hardware controlled execution units and execute relatively complex instructions in a milli-mode architected state with vertical microcode (i.e. millicode) routines executing in the same hardware controlled execution units. More particularly, this invention relates to a set of specialized millicode instructions which reduce the number of millicode instructions and machine cycles required to perform certain complex operations that are called relatively frequently.

2. Description of the Prior Art

Instruction sets used in computer systems employing so-called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

The hardware-executed instructions which are valid only for millicode are generally of a format and a function similar to those of ESA/390 instructions. In this way, the unique hardware required to implement these instructions is minimized, and the simplicity of the hardware design is maintained. This simplicity of hardware controls is a chief advantage of millicode over other forms of internal code (e.g. microcode) which require considerably more unique hardware.

A disadvantage of a millicoded design is that some complex operations require more internal code instructions and/or more machine cycles than with some forms of microcode. In some cases, this is due to the inefficiency of the base instruction set (e.g. the hardware-executed ESA/390 instructions) when used to perform these complex operations. Depending on the frequency with which these operations are performed, the impact on overall system performance may be significant.

Specifically, the base instruction set on a millicoded implementation of ESA/390 is not well suited to efficient emulation of the ESA/390 instructions Compare String, Move String, and Search String. The Search String instruction scans a storage operand until it finds a byte (8 bits) with a specified value. The Move String instruction moves bytes from a storage operand to a new storage location until it finds a byte in the source string with a specified value. The Compare String instruction compares two storage operands byte-by-byte until it finds corresponding bytes that are not equal, or until it finds a specified value (usually an end-ofstring marker). The Compare String instruction also requires that two operands be compared for byte equality, and that the first instruction-ending condition (byte inequality between the two storage operands, or specified ending byte found in either operand) be identified as if all tests were done on each byte before proceeding to the next byte.

These requirements would be simple to satisfy in a millicode implementation that processed one byte at a time, but that would yield unacceptably long execution times for these instructions. On the other hand, pure hardware implementation of these instructions poses a problem due to the requirements that no bytes of storage appear to be accessed beyond the logical end of each operand. Since the length is not known until the ending character is found, this significantly complicates the hardware operand controls and is not consistent with an overall goal of limiting hardware execution to "simple" operations.

An object of this invention is the provision of special millicode instructions that provide efficient millicoded execution of these string operations with minimal increase in hardware complexity.

Briefly, this invention contemplates the provision of special millicode instructions to accelerate the "inner loop" portion of a millicode routine to execute ESA/390 string instructions. Specifically, these millicode instructions are: Replicate Byte, Find Byte Equal, Find Byte Not Equal, and Compare String Bytes instructions.

The Replicate Byte Double millicode instruction copies the low-order byte from one millicode general register (MGR) into each of the 8 bytes of a MGR pair that includes that MGR.

The Find Byte Equal millicode instruction compares two values byte-by-byte and indicates via a condition code where (if anywhere) corresponding bytes of the two operands are equal. Two forms of the instruction are defined, one in which each operand is 8 bytes long and is contained in an MGR pair, and one in which each operand is 4 bytes long and is contained in an MGR.

The Find Byte Not Equal millicode instruction compares two values byte-by-byte and indicates via a condition code where (if anywhere) corresponding bytes of the two operands are unequal. Two forms of the instruction are defined, one in which each operand is 8 bytes long and is contained in an MGR pair, and one in which each operand is 4 bytes long and is contained in an MGR.

The Compare String Bytes millicode instruction compares three operands, each 8 bytes in length, contained in pairs of MGRs. For each byte, working left to right, the corresponding bytes are compared between each pair of operands (1 vs. 2, 2 vs 3, and 1 vs. 3). If the first and second operands are not equal in that byte, or if either the first or second operand is equal to the third operand in that byte, then the condition code is set to indicate which condition was found and an MGR is set to indicate the byte position in which it occurred.

BRIEF DESCRIPTION OF THE DRAWINGS

The foregoing and other objects, aspects and advantages will be better understood from the following detailed description of a preferred embodiment of the invention with reference to the drawings, in which:

FIGS. 2A, 2B, 2C, 2D, 2E and 2F respectively pictorially represent the instructions Replicate Byte Double, Find Byte Equal, Find Byte Equal Double, Find Byte Not Equal, Find Byte Not Equal Double, and Compare String Bytes.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application attorney docket P09-93-035, Ser. No. 08/149,260, filed Nov. 9, 1993, assigned to the assignee of this application, and also incorporated herein by reference.

Figure 1:
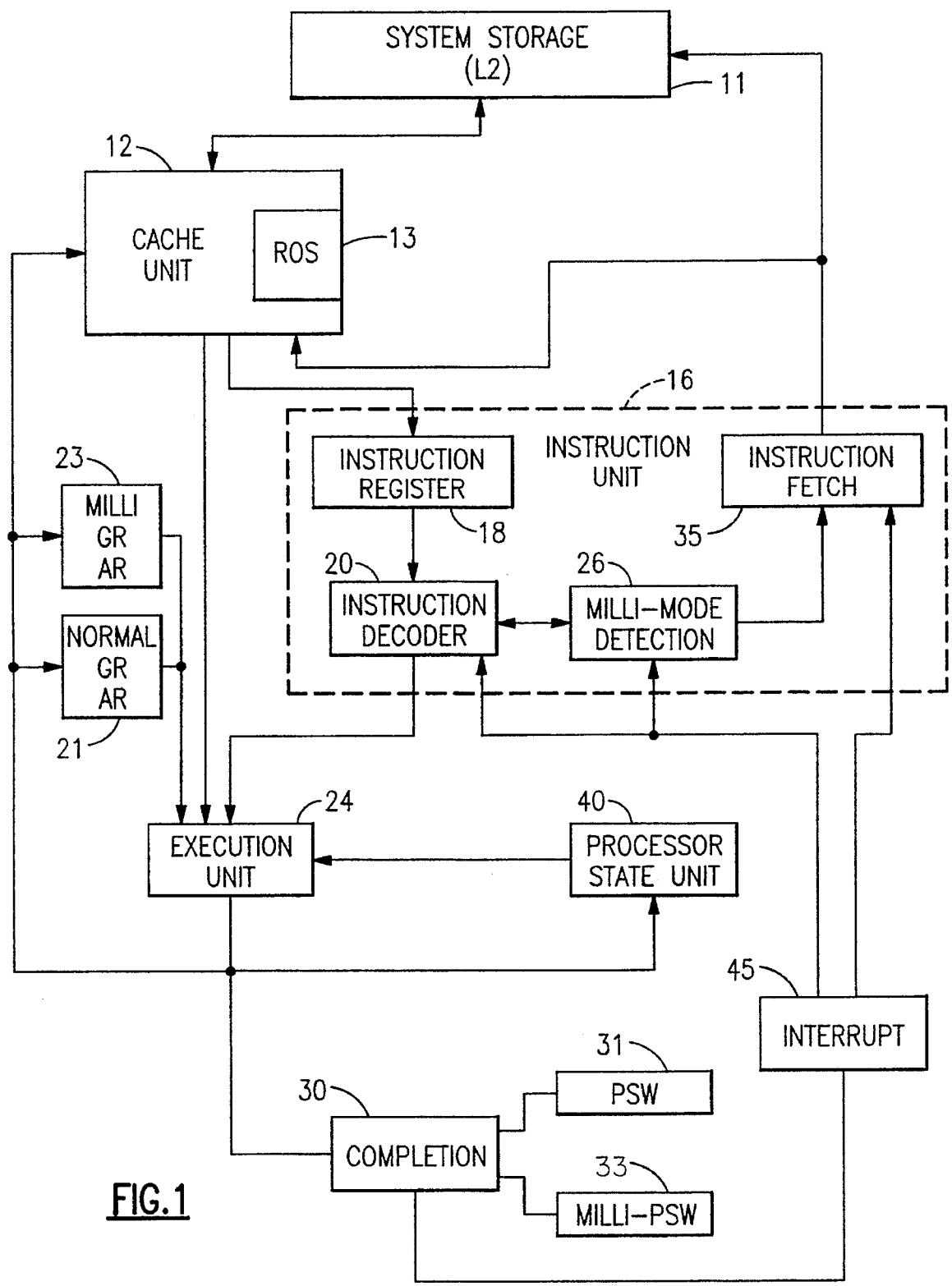
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a cache providing interleaved double word addressing. The cache memory 12 logically includes a contiguously addressable read only store 13, in which code for executing certain frequently invoked milli-mode routines is stored.

An instruction unit subsystem 16 includes an instruction buffer (not shown in FIG. 1), instruction registers 18 and an instruction decoder 20. The instruction unit subsystem receives macro-instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro-code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 25 and places the decoder 20 into a milli-mode operating state. In this state the decoder is enabled to decode milli-mode instructions. Milli-mode instructions are vertical microcode, consisting of a mixture of regular microcode instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers.

A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Replicate Byte Double

Referring now to FIG. 2A, the Replicate Byte Double millicode instruction copies the low-order byte from one millicode general register (MGR) into each of the 8 bytes of a MGR pair that includes that MGR. The formal definition specifies two source MGRs to simplify the hardware implementation; for correct operation the same MGR is specified for both operands.

The byte specified in bits 24:31 of the millicode GR specified by $R_2$ is placed in byte positions 0, 2, 4, and 6 in the millicode GR pair specified by $R_1$, and the byte specified in bits 24:31 of the millicode GR specified by $R_1$ is placed in byte positions 1, 3, 5, and 7 in the millicode GR pair specified by $R_1$.

$R_1$ must specify an even-numbered millicode GR; otherwise results are unpredictable, and may include a machine check.

The intended usage of this instruction is with $R_1=R_2$. In this case, the byte in bits 24:31 of MGR $R_1$ is replicated to all 8 bytes of the even/odd MGR pair specified by $R_1$.

The condition code is not changed.

Find Byte Equal

Referring now to FIG. 2B, the Find Byte Equal millicode instruction compares two values byte-by-byte and indicates via a condition code where (if anywhere) corresponding bytes of the two operands are equal. Two instructions are defined, Find Byte Equal Double in which each operand is 8 bytes long and is contained in an MGR pair, and Find Byte Equal in which each operand is 4 bytes long and is contained in a single MGR. Find Byte Equal Double indicates in the condition code whether a byte equality was found, and if so in which half of the operands (with priority given to the first half). Find Byte Equal indicates which of the 4 bytes is the first (processing from left to right) to contain a byte equality. These may be used together to find the first matching byte in a string by using Find Byte Equal Double to compare 8 bytes at a time until an equality is found, then using Find Byte Equal on the 4 bytes in which an equality is indicated to precisely identify the position of the matching byte.

The corresponding bytes of the millicode GRs specified by $R_1$ and $R_2$ are compared, and the condition code is set to indicate the byte position of the first pair of corresponding bytes which are equal. The bytes are compared in left-to-right order, and only equality or inequality is tested.

The condition code is set to the byte position of the first byte equality found. If no corresponding bytes are equal, condition code zero is set. It is intended that this instruction be used only after Find Byte Equal Double has been used to test for the presence of an equal byte in the specified registers; otherwise the millicode must perform an additional test to distinguish between the case of no matching bytes and that of a match in byte 0, since both of these cases set the condition code to zero. The condition code settings are:

| CC | Condition |
| --- | --- |
| 0 | Byte 0 (bits 0:7) equal, or no equal byte found |
| 1 | Byte 1 (bits 8:15) equal, and no equality in byte 0 |
| 2 | Byte 2 (bits 16:23) equal, and no equality in byte 0 or 1 |
| 3 | Byte 3 (bits 24:31) equal, and no equality in byte 0, 1, or 2. |

Find Byte Equal Double

Referring now to FIG. 2C, the corresponding bytes of the millicode GR pairs specified by $R_1$ and $R_2$ are compared, and the condition code is set to indicate which word of the pair, if any, contains the first byte equality. The bytes are compared in left-to-right order, and only equality or inequality is tested.

The condition code is set as follows:

| CC | Condition |
| --- | --- |
| 0 | No corresponding bytes are equal |
| 1 | Byte equality found in byte 0, 1, 2, or 3 (i.e. in GR $R_1/R_2$) |
| 2 | Byte equality found in byte 4, 5, 6, or 7 (i.e. in $GR_1 + 1/R_2 + 1$) |

Find Byte Not Equal

Referring now to FIG. 2D, the Find Byte Not Equal millicode instruction compares two values byte-by-byte and indicates via a condition code where (if anywhere) corresponding bytes of the two operands are unequal. Two instructions are defined, Find Byte Not Equal Double in which each operand is 8 bytes long and is contained in an MGR pair, and Find Byte Not Equal in which each operand is 4 bytes long and is contained in a single MGR. Find Byte Not Equal Double indicates in the condition code whether a byte inequality was found, and if so in which half of the operands (with priority given to the first half). Find Byte Not Equal indicates which of the 4 bytes is the first (processing from left to right) to contain a byte inequality. These may be used together to find the first unequal corresponding bytes in a pair of strings by using Find Byte Not Equal Double to compare 8 bytes at a time until an inequality is found, then using Find Byte Not Equal on the 4 bytes in which an inequality is indicated to precisely identify the position of the unequal bytes.

The corresponding bytes of the millicode GRs specified by $R_1$ and $R_2$ are compared, and the condition code is set to indicate the byte position of the first pair of corresponding bytes which are not equal. The bytes are compared in left-to-right order, and only equality or inequality is tested.

The condition code is set to the byte position of the first byte inequality found. If all corresponding bytes are equal, condition code zero is set. It is intended that this instruction be used only after Find Byte Not Equal Double has been used to test for the presence of an unequal byte in the specified registers; otherwise the millicode must perform an additional test to distinguish between the case of all bytes being equal and that of an inequality in byte 0, since both of these cases set the condition code to zero. The condition code settings are:

| CC | Condition |
| --- | --- |
| 0 | Byte 0 (bits 0:7) not equal, or all bytes equal |
| 1 | Byte 1 (bits 8:15) not equal, and no inequality in byte 0 |
| 2 | Byte 2 (bits 16:23) not equal, and no inequality in byte 0 or 1 |
| 3 | Byte 3 (bits 24:31) not equal, and no inequality in byte 0, 1, or 2 |

Find Byte Not Equal Double

Referring now to FIG. 2E, the corresponding bytes of the millicode GR pairs specified by $R_1$ and $R_2$ are compared, and the condition code is set to indicate which word of the pair, if any, contains the first byte inequality. The bytes are compared in left-to-right order, and only equality or inequality is tested.

The condition code is set as follows:

| CC | Condition |
| --- | --- |
| 0 | All corresponding bytes are equal |
| 1 | Byte inequality found in byte 0, 1, 2, or 3 (i.e. in GR $R_1/R_2$) |
| 2 | Byte inequality found in byte 4, 5, 6, or 7 (i.e. in GR $R_1 + 1/R_2 + 1$) |

Compare String Bytes

Figure 3:
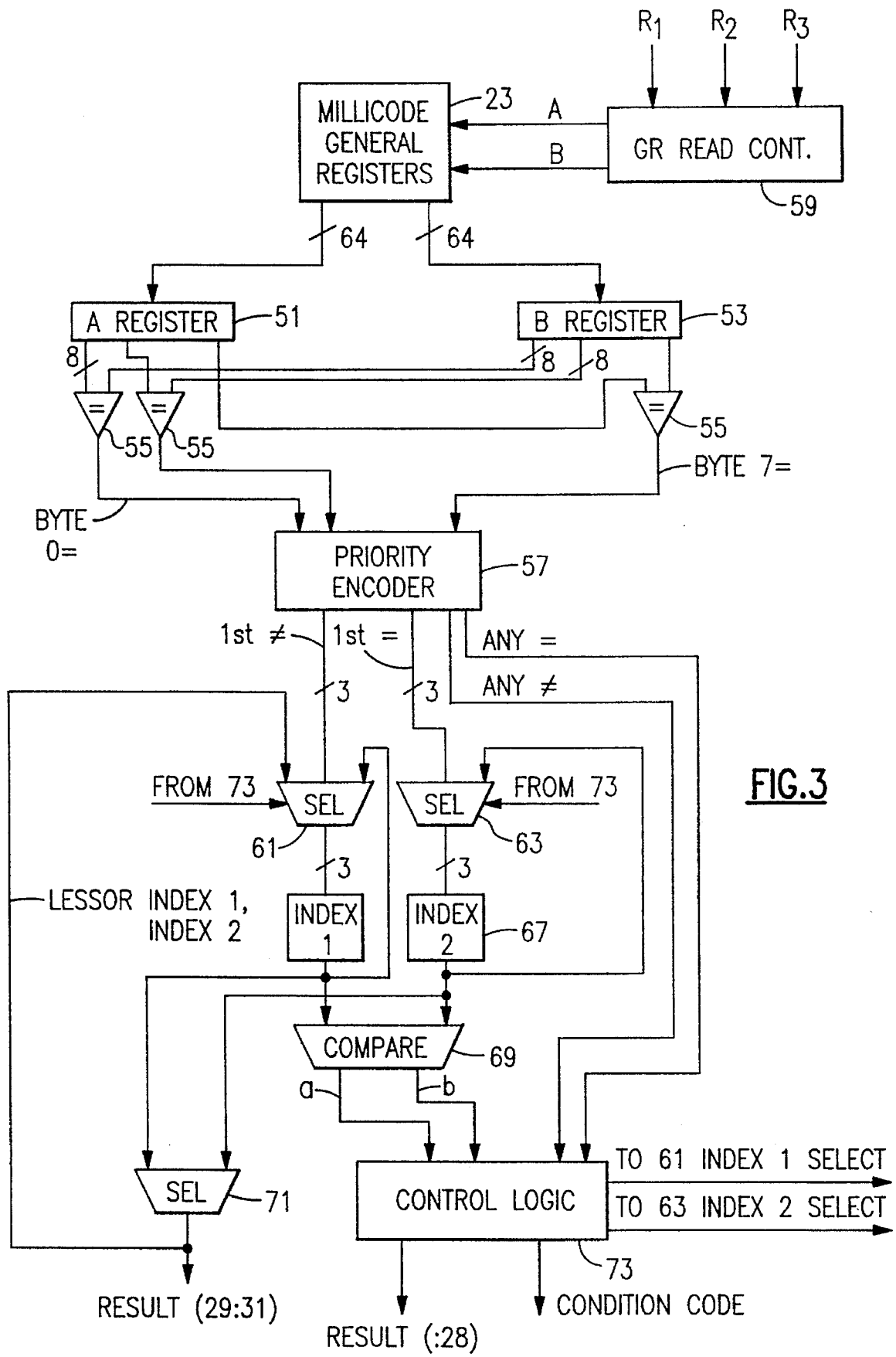
FIGS. 3 and 4 illustrate an implementation of the Compare String Bytes instruction.
Figure 4:
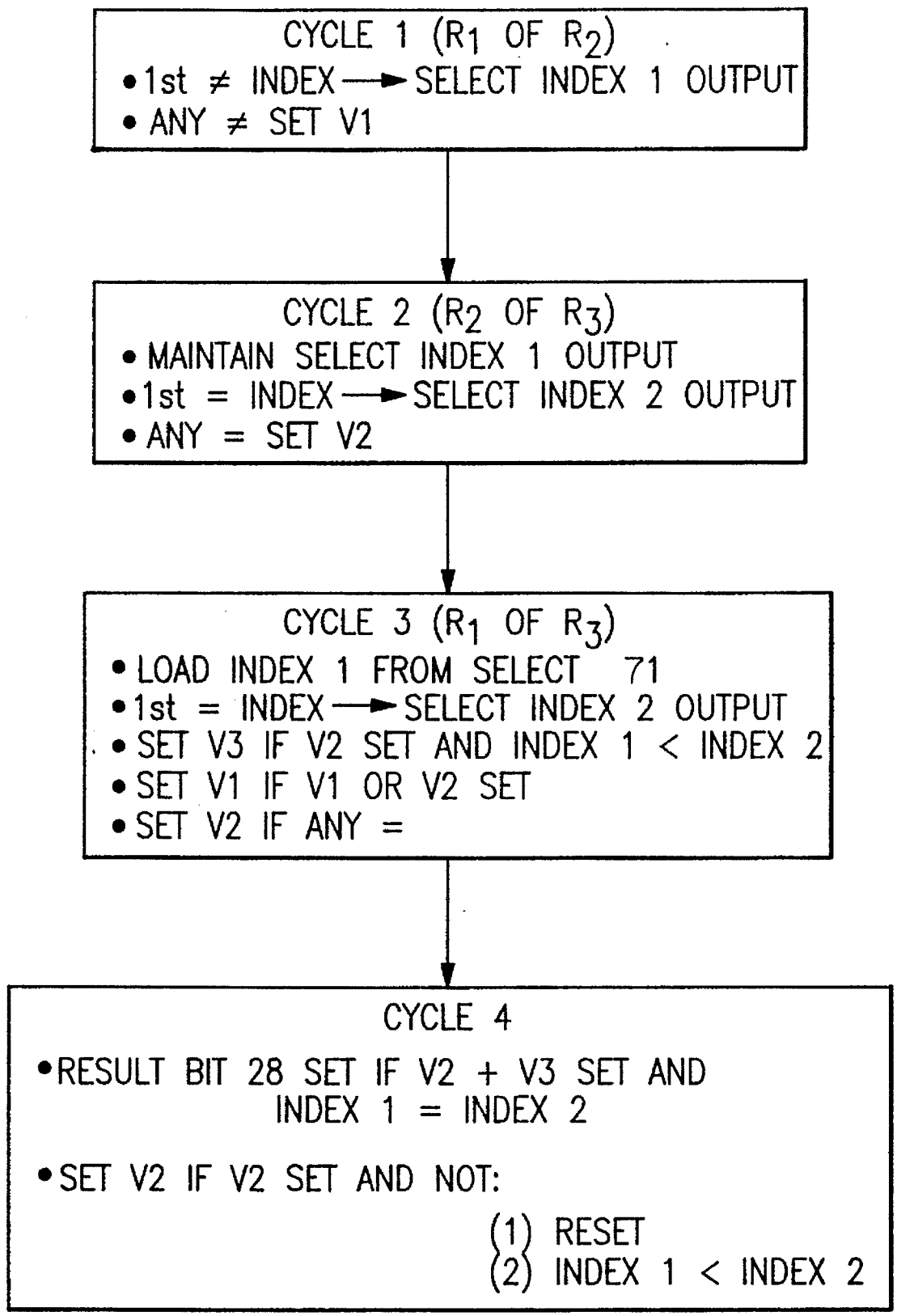

Referring now to FIGS. 2F, 3 and 4, the Compare String Bytes millicode instruction compares three operands in millicode general registers $R_1$, $R_2$ and $R_3$. Each string is 8 bytes in length and they are compared in pairs; $R_1$–$R_2$; $R_2$–$R_3$; and $R_1$–$R_3$. For each byte, working left to right, the corresponding bytes are compared between each pair of operands (1 vs. 2, 2 vs 3, and 1 vs. 3). If the first and second operands are not equal in that byte, or if either the first or second operand is equal to the third operand in that byte, then the condition code is set to indicate which condition was found and an MGR is set to indicate the byte position in which it occurred. Only the first such condition found (working left to right one byte at a time) is reported in the condition code and result MGR. If no such conditions are found in any of the 8 bytes, the condition code is set to indicate this. The hardware implementation of this instruction is shown in FIGS. 3 and 4. It performs three 8-byte comparisons (one for each pair of operands) and combines the results of these comparisons to obtain the same final result as if the comparisons had been performed one byte at a time. The corresponding bytes of the millicode GRs specified by $R_1$, $R_2$ and $R_3$ are compared, and the condition code and millicode GR 0 are set to indicate the results of those comparisons. The bytes are compared in left-to-right order, and only equality or inequality is tested.

The comparisons formed check for byte inequality between MGRs $R_1$ and $R_2$, and for byte equality between MGRs $R_1$ and $R_3$, or between MGRs $R_2$ and $R_3$. The condition code is set to indicate which (if any) of these conditions was met. If multiple conditions are satisfied, the condition code indicates which condition was satisfied first when processing in left-to-right order, a byte equality between either MGR $R_1$ or $R_2$ and MGR $R_3$ takes precedence over a byte inequality between MGRs $R_1$ and $R_2$ (at the same byte position) in the condition code setting. Bits 29:31 of millicode GR 0 are set to the byte position of the first byte to satisfy any condition, provided that at least one condition was met in at least one byte. Bit 28 of MGR 0 is set to '1'b if byte equality was among all three operands in the indicated byte position, and to '0'b otherwise. Bits 0:27 or MGR 0 are set to zeros. When condition code 0 is indicated, bits 28:31 of MGR 0 are unpredictable.

It is intended that this instruction be used to implement the ESA/390 instruction Compare String.

3-16 The condition code settings are:

| CC | Condition |
|---|---|
| 0 | No comparison condition met in any byte position |
| 1 | Byte equality found between MGR $R_1$ and MGR $R_3$ |
| 2 | Byte equality found between MGR $R_2$ and MGR $R_3$ |
| 3 | Byte inequality found between MGR $R_1$ and MGR $R_2$ |

Specifically, a general register read control 59 controls the sequence in which each of the 8-byte operands (e.g. $R_1$ cf $R_2$; $R_2$ cf $R_3$; and $R_1$ cf $R_3$) are compared. In this pair sequence, one 8-byte operand is transferred to a register (A) 51 and the other operand of the pair to a register (B) 53. Eight 1-byte comparators 55 compare corresponding bytes in the A register and B register and output a signal to priority encoder 57 of one binary state if the corresponding bytes are equal and the opposite binary state if the corresponding bytes are unequal.

Priority encoder 57 has four outputs; ANY= output indicates if any of the bytes are equal; ANY≠ output indicates when none of the bytes are equal; 1ST= indicates the byte position of the first byte equality found and if none found indicates a value of 7; and 1ST≠ indicates the first byte position in which the corresponding bytes are not equal and if no such inequality is found indicates the value 7. The ANY= and ANY≠ outputs are connected to control logic 73 and the 1ST= and 1ST≠ are coupled respectively to selectors 61 and 63. The outputs of selectors 61 and 63 are coupled respectively to index registers 65 (Index 1) and 67 (Index 1). A comparator 69 compares the Index 1 and Index 2 values and its outputs a and b indicate respectively when the value of index 1 is less than the value of index 2 or equal to the value of index 2. The output a is also connected as a select input to a selector 71 to select the smaller value of Index 1 or Index 2 and the output of selector 71 is coupled back as an input to selector 61. In addition, it should be noted that the output of Index 1 is also coupled back as an input to selector 61 and in addition the output of Index 2 is coupled back as an input to selector 63.

Control logic 73 provides the select inputs (Index 1 select and Index 2 select) to selectors 61 and 63, respectively, and a result (Result) to be loaded at bit 28 of MGR 0. The output of selector 71 sets bits 29:31 of MGR 0.

Referring now to FIG. 4, the operation of the control logic 73 in the first cycle (MGR registers R1 and R2 being compared) the control logic 73 selects selector 61 to load index register 65 with the FIRST≠ entry from priority encoder 57 and in addition sets control latch V1 in response to AND≠ output from the priority encoder, block 107. In the second cycle (MGR registers R2 and R3 being compared), the value Index 1 in register 65 is held and control logic 73 selects selector 63 to input the FIRST= byte from the priority encoder 57 into Index 2 register 67. In addition, any equal output from priority encoder 57 during this cycle sets control latch V2. In cycle 3, MGR registers R1 and R3 are compared. The output state of selector 71 is an input to selector 61 and during this cycle control logic 73 selects selector 61 so that that its value is loaded in this cycle into register 65 (Index 1). Here it should be noted that the value thusly loaded into Index 1 is the smaller of the values that had been previously loaded in Index 1 and Index 2. The control logic selects selector 63 in response to the FIRST= output from priority encoder 73. During this cycle a control latch V3 is set upon the condition that a control latch V2 is set and comparator 69 indicates that the value stored in Index 1 is less than the value stored in Index 2, which indicates the respective byte positions in which the conditions from the first two cycles were met. Control latch V1 remains set as previously set or is set if control latch V2 is set. Control latch V2 is set during this cycle in response to an any equal response from priority encoder 57 similar to the operation in cycle 2.

In cycle 4, control logic 73 sets the result output (bit 28) to a 1 if control latches V2 and V3 are set and in addition comparator 69 indicates that the value of index 1 is equal to the value of index 2. In addition, control latch V2 is reset to 0 if control latch V1 is set and the value of Index 1 is less than the value of Index 2, as indicated by comparator 69. The final state of the latches V1, V2 and V3 sets the condition code. If control latch V2 is on, condition code 1 is set irrespective of the state of latches V1 and V3. If latches V1 and V2 are both off, condition code 0 is set. If latch V2 is off and latch V1 is on, latch V3 determines the condition code. In this latter state when latch V3 is on, condition code 2 is set and when latch V3 is off condition code 3 is set.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method to copy a low-order byte from a first millicode general register into each byte position of a millicode general register pair that includes said first millicode general register pair, including the steps of:

storing a millicode instruction that includes a first field specifying a first millicode general register, a second field that specifies a second millicode general register, a field that specifies a byte in said first millicode general register to be placed in even byte positions in said second millicode general register and also specifies a byte in said second millicode general register to be placed in odd byte positions in said second millicode general register; and fetching and executing said millicode instruction.

2. A method as in claim 1 wherein said first field and said second field specify the same register.

3. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method to compare two operands on a basis of equality of their respective corresponding byte-by-byte values and to indicate by means of a condition code where corresponding bytes of the two operands are equal, including the steps of:

storing a millicode instruction which includes a first field specifying a millicode general register in which is stored a first operand of said two operands to be compared, and a second field specifying a millicode general register in which is stored a second operand of said two operands to be compared;

fetching said millicode instruction;

comparing respective corresponding bytes of said first operand and said second operand on a byte-by-byte basis; and setting a condition code to indicate an initial byte of said first operand and said second operand found equal as a result of said comparing step.

4. A method as in claim 3 in which each of said first operand and said second operand is four bytes and is contained in a single millicode general register.

5. A method as in claim 3 in which each of said first operand and said second operand is eight bytes and is contained in a millicode general register pair.

6. A method as in claim 5 wherein said condition code indicates a register of the millicode general register pair in which a byte equality is found.

7. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method to compare two operands on a basis of inequality of their respective corresponding byte-by-byte values and to indicate by means of a condition code where corresponding bytes of the two operands are not equal, including the steps of:

storing a millicode instruction which includes a first field specifying a millicode general register in which is stored a first operand of said two operands to be compared, and a second field specifying a millicode general register in which is stored a second operand of said two operands to be compared;

fetching said millicode instruction;

comparing respective corresponding bytes of said first operand and said second operand on a byte-by-byte basis; and setting a condition code to indicate an initial byte of said first operand and said second operand found not equal as a result of said comparing step.

8. A method as in claim 7 in which each of said first operand and said second operand is four bytes and is contained in a single millicode general register.

9. A method as in claim 7 in which each of said first operand and said second operand is eight bytes and is contained in a millicode general register pair.

10. A method as in claim 5 wherein said condition code indicates a register of the millicode general register pair in which a byte inequality is found.

11. In a pipelined computer processor, which executes a relatively simple instruction set in a hardware controlled execution unit and executes a relatively complex instruction set in a milli-mode architected state with a millicode sequence of simple instructions in said hardware controlled execution unit, a millicode method to compare a first, a second, and a third multibyte operand on a byte-by-byte basis of correspondingly positioned bytes in each said multibyte operand and to indicate when corresponding bytes in the first and the second multibyte operand are not equal or if either the corresponding bytes in the first and the second multibyte operand is equal to a corresponding byte in the third multibyte operand, including the steps of:

storing a millicode instruction including a field specifying a millicode general register for storing said first multibyte operand, a field specifying a millicode general register for storing said second multibyte operand, a field specifying a millicode general register for storing said third multibyte operand, and a field specifying a millicode general register for storing a condition code;

fetching said millicode instruction;

comparing said first, said second, and said third multibyte operand on a byte-by-byte basis of correspondingly positioned bytes in each said multibyte operand; and setting a condition code in said millicode general register for storing a condition code to indicate when a corresponding byte in the first and the second multibyte operand are not equal or if either the corresponding byte in the first and the second multibyte operand is equal to a corresponding byte in the third multibyte operand.

12. In a pipelined computer processor, which executes a relatively simple instruction set in a hardware controlled execution unit and executes a relatively complex instruction set in a milli-mode architected state with a millicode sequence of simple instructions in said hardware controlled execution unit, a method of operation including the steps of:

storing a first millicode instruction to copy a low-order byte from a first millicode general register into each byte position of a millicode general register pair that includes said first millicode general register pair, said first millicode instruction including a first field specifying a first millicode general register, a second field that specifies a second millicode general register, a field that specifies a byte in said first millicode general register to be placed in even byte positions in said second millicode general register and also specifies a byte in said second millicode general register to be placed in odd byte positions in said second millicode general register; and fetching and executing said first millicode instruction;

storing a second millicode instruction to compare two operands on a basis of equality of their respective corresponding byte-by-byte values and to indicate by means of a condition code where corresponding bytes of the two operands are equal, said second millicode instruction including a first field specifying a millicode general register in which is stored a first operand of said two operands to be compared, and a second field specifying a millicode general register in which is stored a second operand of said two operands to be compared;

fetching and executing said second millicode instruction, including comparing respective corresponding bytes of said first operand and said second operand on a byte-by-byte basis, and setting a condition code to indicate an initial byte of said first operand and said second operand found equal as a result of said comparing step;

storing a third millicode instruction to compare two operands on a basis of inequality of their respective corresponding byte-by-byte values and to indicate by means of a condition code where corresponding bytes of the two operands are not equal;

said third millicode instruction including a first field specifying a millicode general register in which is stored a first operand of said two operands to be compared, and a second field specifying a millicode general register in which is stored a second operand of said two operands to be compared;

fetching and executing said third millicode instruction, including comparing respective corresponding bytes of said first operand and said second operand on a byte-by-byte basis, and setting a condition code to indicate an initial byte of said first operand and said second operand found not equal as a result of said comparing step.

* * * * *

UNITED STATES PATENT AND TRADEMARK OFFICE
CERTIFICATE OF CORRECTION

PATENT NO. : 5,611,062
DATED : March 11, 1997
INVENTOR(S) : Webb et al.

It is certified that error appears in the above-indentified patent and that said Letters Patent is hereby corrected as shown below:

Column 10, line 35, claim 1          delete the word "pair"

Column 12, line 20, claim 12          delete the word "pair"

Signed and Sealed this

Thirtieth Day of September, 1997

Attest:

BRUCE LEHMAN

Attesting Officer          Commissioner of Patents and Trademarks